(12) United States Patent
Hodge (10) Patent No.: US 10,735,431 B2
(45) Date of Patent: *Aug. 4, 2020

(54) CONTROL OF INTERNET BROWSING IN A SECURE ENVIRONMENT

(71) Applicant: **Global Tel*Link Corp.**, Reston, VA (US)

(72) Inventor: Stephen L. Hodge, Aubry, TX (US)

(73) Assignee: **Global Tel*Link Corp.**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/377,597

(22) Filed: Dec. 13, 2016

(65) Prior Publication Data

US 2018/0167396 A1 Jun. 14, 2018

Related U.S. Application Data

(63) Continuation of application No. 15/341,572, filed on Nov. 2, 2016.

(51) Int. Cl.
*H04L 29/06* (2006.01)
*H04L 29/08* (2006.01)

(52) U.S. Cl.
CPC ......... *H04L 63/102* (2013.01); *H04L 63/308* (2013.01); *H04L 67/02* (2013.01); *H04L 67/1002* (2013.01); *H04L 67/12* (2013.01); *H04L 67/22* (2013.01); *H04L 67/306* (2013.01); *H04L 67/42* (2013.01); *H04L 63/0861* (2013.01)

(58) Field of Classification Search
CPC ....... H04L 63/102; H04L 63/08; H04L 63/10; H04L 63/0861; H04L 63/308; H04L 67/02; H04L 67/12; H04L 67/22; H04L 67/306; H04L 67/42; H04L 67/1002; G06F 21/31; G06F 21/32
See application file for complete search history.

(56) References Cited

U.S. PATENT DOCUMENTS

| | | | |
|---|---|---|---|
| 4,054,756 | A | 10/1977 | Comella et al. |
| 4,191,860 | A | 3/1980 | Weber |
| 4,933,966 | A | 6/1990 | Hird et al. |
| 4,935,956 | A | 6/1990 | Hellwarth et al. |
| 5,319,702 | A | 6/1994 | Kitchin et al. |
| 5,371,842 | A | 12/1994 | Easton et al. |

(Continued)

OTHER PUBLICATIONS

International Search Report and Written Opinion of the International Searching Authority directed to related International Patent Application Publication No. PCT/US17/59325, dated Jan. 26, 2018; 13 pages.

(Continued)

*Primary Examiner* — Yogesh Paliwal
(74) *Attorney, Agent, or Firm* — Sterne, Kessler, Goldstein & Fox, P.L.L.C.

(57) ABSTRACT

A system and method are disclosed for providing internet access to residents of a controlled-environment facility. There are significant dangers associated with provide such residents with Internet access due to their criminal history. However, through the generation, updating and application of strict browsing restrictions, as well as the authentication of multiple forms of identifying information, Internet access can be provided to those residents safely and securely.

20 Claims, 6 Drawing Sheets

(56) References Cited

U.S. PATENT DOCUMENTS

| | | | |
|---|---|---|---|
| 5,469,370 | A | 11/1995 | Ostrover et al. |
| 5,539,812 | A | 7/1996 | Kitchin et al. |
| 5,570,417 | A | 10/1996 | Byers |
| 5,655,013 | A | 8/1997 | Gainsboro |
| 5,768,355 | A | 6/1998 | Salibrici et al. |
| 5,778,313 | A | 7/1998 | Fougnies |
| 5,854,975 | A | 12/1998 | Fougnies et al. |
| 5,883,945 | A | 3/1999 | Richardson, Jr. et al. |
| 5,923,746 | A | 7/1999 | Baker et al. |
| 5,926,533 | A | 7/1999 | Gainsboro |
| 5,991,376 | A | 11/1999 | Hennessy et al. |
| 6,002,427 | A | 12/1999 | Kipust |
| 6,016,343 | A | 1/2000 | Hogan et al. |
| 6,052,454 | A | 4/2000 | Kek et al. |
| 6,570,970 | B2 | 5/2003 | Gruchala et al. |
| 6,636,591 | B1 | 10/2003 | Swope et al. |
| 6,639,977 | B1 | 10/2003 | Swope et al. |
| 6,647,096 | B1 | 11/2003 | Milliorn et al. |
| 6,668,045 | B1 | 12/2003 | Mow |
| 6,690,950 | B2 | 2/2004 | Takagi et al. |
| 6,728,345 | B2 | 4/2004 | Glowny et al. |
| 6,819,932 | B2 | 11/2004 | Allison et al. |
| 6,850,609 | B1 | 2/2005 | Schrage |
| 6,970,554 | B1 | 11/2005 | Peterson et al. |
| 7,005,993 | B2 | 2/2006 | Webb et al. |
| 7,046,779 | B2 | 5/2006 | Hesse |
| 7,076,031 | B1 | 7/2006 | Bress et al. |
| 7,079,636 | B1 | 7/2006 | McNitt et al. |
| 7,079,637 | B1 | 7/2006 | McNitt et al. |
| 7,106,843 | B1 | 9/2006 | Gainsboro et al. |
| 7,134,130 | B1 | 11/2006 | Thomas |
| 7,164,757 | B2 | 1/2007 | Link |
| 7,197,560 | B2 | 3/2007 | Caslin et al. |
| 7,256,816 | B2 | 8/2007 | Profanchik et al. |
| 7,333,798 | B2 | 2/2008 | Hodge |
| 7,496,345 | B1 | 2/2009 | Rae et al. |
| 7,505,406 | B1 | 3/2009 | Spadaro et al. |
| 7,529,357 | B1 | 5/2009 | Rae et al. |
| 7,551,732 | B2 | 6/2009 | Anders |
| 7,742,581 | B2 | 6/2010 | Hodge et al. |
| 7,742,582 | B2 | 6/2010 | Harper |
| 7,783,021 | B2 | 8/2010 | Hodge |
| 7,805,457 | B1 | 9/2010 | Viola et al. |
| 7,809,170 | B2 * | 10/2010 | Phoha ................. G06K 9/6288 340/5.8 |
| 7,853,243 | B2 | 12/2010 | Hodge |
| 7,860,222 | B1 | 12/2010 | Sidler et al. |
| 7,881,446 | B1 | 2/2011 | Apple et al. |
| 7,899,167 | B1 | 3/2011 | Rae |
| 7,961,860 | B1 | 6/2011 | McFarlen |
| 7,965,821 | B2 | 6/2011 | Bouchard et al. |
| 8,014,800 | B2 | 9/2011 | Törnkvist |
| 8,098,804 | B1 | 1/2012 | Rae et al. |
| 8,135,115 | B1 | 3/2012 | Hogg, Jr. et al. |
| 8,180,028 | B1 | 5/2012 | Falcone et al. |
| 8,204,177 | B2 | 6/2012 | Harper |
| 8,351,593 | B2 | 1/2013 | Vick et al. |
| 8,428,559 | B2 | 4/2013 | Silva |
| 8,458,732 | B2 | 6/2013 | Hanna et al. |
| 8,488,756 | B2 | 7/2013 | Hodge et al. |
| 8,509,390 | B2 | 8/2013 | Harper |
| 8,577,003 | B2 | 11/2013 | Rae |
| 8,583,527 | B2 | 11/2013 | Polozola et al. |
| 8,626,118 | B2 | 1/2014 | Smith et al. |
| 8,644,466 | B1 | 2/2014 | Dawson |
| 8,855,280 | B1 | 10/2014 | Passe et al. |
| 8,976,949 | B2 | 3/2015 | Torgersrud et al. |
| 9,043,813 | B2 | 5/2015 | Hanna et al. |
| 9,077,680 | B2 | 7/2015 | Harper |
| 9,124,763 | B2 | 9/2015 | Humphries |
| 9,210,175 | B2 | 12/2015 | Gupta |
| 9,614,974 | B1 | 4/2017 | Hodge et al. |
| 9,692,889 | B2 | 6/2017 | Rokosky et al. |
| 2002/0067810 | A1 | 6/2002 | Barak et al. |
| 2002/0073207 | A1 | 6/2002 | Sidler et al. |
| 2002/0095296 | A1 * | 7/2002 | Hind ................. G10L 21/06 704/500 |
| 2002/0095415 | A1 | 7/2002 | Walker et al. |
| 2002/0118798 | A1 | 8/2002 | Langhart et al. |
| 2002/0183040 | A1 | 12/2002 | Lundstrom et al. |
| 2002/0194096 | A1 | 12/2002 | Falcone et al. |
| 2003/0002639 | A1 | 1/2003 | Huie |
| 2003/0046083 | A1 | 3/2003 | Devinney, Jr. et al. |
| 2003/0086546 | A1 | 5/2003 | Falcone et al. |
| 2004/0058667 | A1 | 3/2004 | Pienmaki et al. |
| 2004/0177276 | A1 * | 9/2004 | MacKinnon ........ H04L 63/0263 726/5 |
| 2004/0267929 | A1 * | 12/2004 | Xie ................. H04L 29/06 709/225 |
| 2005/0094794 | A1 | 5/2005 | Creamer et al. |
| 2005/0102371 | A1 | 5/2005 | Aksu |
| 2005/0141678 | A1 | 6/2005 | Anders et al. |
| 2005/0207357 | A1 | 9/2005 | Koga |
| 2005/0259809 | A1 | 11/2005 | Hodge |
| 2006/0098796 | A1 | 5/2006 | Link |
| 2006/0149644 | A1 | 7/2006 | Salmar et al. |
| 2006/0285650 | A1 * | 12/2006 | Hodge ................. H04M 3/2281 379/32.01 |
| 2006/0294043 | A1 | 12/2006 | Taisdeal |
| 2007/0071206 | A1 | 3/2007 | Gainsboro et al. |
| 2007/0133437 | A1 | 6/2007 | Wengrovitz et al. |
| 2007/0155411 | A1 | 7/2007 | Morrison |
| 2008/0012760 | A1 | 1/2008 | Derrick et al. |
| 2008/0023543 | A1 | 1/2008 | Beisang |
| 2009/0067587 | A1 | 3/2009 | Rokosky et al. |
| 2009/0254392 | A1 | 10/2009 | Zander |
| 2010/0299761 | A1 | 11/2010 | Shapiro |
| 2011/0247045 | A1 | 10/2011 | Rajagopal et al. |
| 2013/0179949 | A1 | 7/2013 | Shapiro |
| 2013/0279668 | A1 | 10/2013 | Rokosky et al. |
| 2013/0279686 | A1 | 10/2013 | Keiser et al. |
| 2013/0304581 | A1 | 11/2013 | Soroca et al. |
| 2013/0340028 | A1 | 12/2013 | Rajagopal et al. |
| 2014/0033230 | A1 | 1/2014 | Hanna et al. |
| 2015/0188925 | A1 * | 7/2015 | Gupta ................. H04L 63/101 726/4 |
| 2015/0358457 | A1 | 12/2015 | Hodge |
| 2016/0028786 | A1 | 1/2016 | Hanna et al. |
| 2016/0103996 | A1 | 4/2016 | Salajegheh et al. |
| 2016/0165393 | A1 | 6/2016 | Pang |
| 2016/0191484 | A1 | 6/2016 | Gongaware |
| 2016/0210607 | A1 | 7/2016 | Griffin |
| 2016/0248766 | A1 | 8/2016 | Tembey et al. |
| 2016/0309122 | A1 | 10/2016 | Kingery |
| 2017/0032150 | A1 * | 2/2017 | Hamlin ................. G06F 21/84 |

OTHER PUBLICATIONS

International Search Report and Written Opinion directed to related International Patent Application No. PCT/US17/64932, dated Jan. 5, 2018; 11 pages.

Definitions of "circuit switching" and "packet switching", Newton's Telecom Dictionary, 10th Edition, 1996, p. 253.

"Bellcore Notes on the Networks (Formerly BOC Notes on the LEC Networks)," Bellcore, Special Report SR-2275, Issue 3, Dec. 1997.

"Cisco IAD2400 Series Business-Class Integrated Access Device", Cisco Systems Datasheet, 2003.

"Cisco IAD2420 Series Integrated Access Devices Software Configuration Guide—Initial Configuration," Cisco Systems, accessed Sep. 23, 2014, accessible at http://www.cisco.com/en/US/docs/routers/access/2400/2420/software/configuration/guide/init_cf.html.

"PacketCable™ Audio/Video Codecs Specification," Cable Television Laboratories, Inc., Ser. No. PKT-SP-CODEC-I05-040113 (2004).

"SIP and IPLinkTM in the Next Generation Network: An Overview," Intel, 2001.

"The AutoEDMS Document Management and Workflow System: An Overview of Key Features, Functions and Capabilities," ACS Software, May 2003.

"Voice Over Packet in Next Generation Networks: An Architectural Framework," Bellcore, Special Report SR-4717, Issue 1, Jan. 1999.

(56) References Cited

OTHER PUBLICATIONS

"Criminal Calls: A Review of the Bureau of Prisons' Management of Inmate Telephone Privileges," U.S. Department of Justice, Office of the Inspector General, Aug. 1999.
"Why Can't You Make a Collect Call to a Cell Phone," National Public Radio, Jun. 30, 2008, Accessed via http://www.npr.org/templates/story/story.php?storyId=92021561 on Apr. 6, 2015.
1800MumDad.com.au—Explanation, Aug. 29, 2007— Retrieved from the Internet Archive Wayback Machine at https://web.archive.org/web/20070829114354/http://1800mumdad.com.au/main.php?type=charges2; 2 pages.
1800MumDad.com.au—Summary Standard Form of Agreement, Apr. 26, 2006 —Retrieved from the Internet Archive Wayback Machine at https://web.archive.org/web/20060426180115/http://www.1800mumdad.com.au/main.php?type=summarysfoa; 3 pages.
Ahimovic et al., "Services for Tomorrow's PCS," IEEE International Conference on Universal Personal Communications, vol. 1, Oct. 12-15, 1993; pp. 222-227.
Appendices A-G of U.S. Appl. No. 60/377,763, filed May 3, 2002. Assignment of U.S. Pat. No. 8,190,121 and U.S. Appl. No. 13/449,308.
Brown, et al., "SMS: The Short Message Service," Computer, vol. 40, No. 12, 2007.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Clifford J. Weinstein, MIT, The Experimental Integrated Switched Network—A System-Level Network Test Facility (IEEE 1983).
Commander Call Control System, Rev. 1.04 (Science Dynamics 2002).
Confalone et al., "Calling Card Service—TSPS Hardware, Software, and Signaling Implementation," The Bell System Technical Journal, Sep. 1982, vol. 61, No. 7; pp. 1675-1714.
Definition of "telephony", McGraw-Hill Dictionary of Scientific and Technical Terms, 6th Edition (McGraw-Hill, 2003).
Definitions of "Local Area Network (LAN)" and "Wide Area Network (WAN)," Microsoft Computer Dictionary (Microsoft Press 2002), pp. 304 and 561.
Excerpts from the Prosecution History of U.S. Appl. No. 10/135,878, filed Apr. 29, 2002.
File History of U.S. Pat. No. 6,636,591, U.S. Appl. No. 09/640,999, filed Aug. 17, 2000.
File History of U.S. Pat. No. 8,135,115, U.S. Appl. No. 11/603,938, filed Nov. 22, 2006.
File History of U.S. Pat. No. 8,190,121, U.S. Appl. No. 12/103,138, filed Apr. 15, 2008.
File History of U.S. Pat. No. 8,577,003, U.S. Appl. No. 13/009,483, filed Jan. 19, 2011.
File History of U.S. Pat. No. 8,626,118, U.S. Appl. No. 13/449,308, filed Apr. 17, 2012.
Reexamination U.S. Appl. No. 90/012,802 of U.S. Pat. No. 8,190,121, filed Mar. 1, 2013.
Fleischman, E., "Advanced Streaming Format (ASF) Specification," Microsoft Corporation (Jan. 9, 1998).
Garner, et al., "Mobile Terminated SMS Billing—Exploits and Security Analysis," IEEE International Conference on Information Technology: New Generations, 2006.
Jain, A., "An Introduction to Biometric Recognition," IEEE Transactions on Circuits and Systems for Video Technology, vol. 14, No. 1, Jan. 2004; pp. 4-20.
Jeff Hewett and Lee Dryburgh, Signaling System No. 7 (SS7/C7): Protocol, Architecture, and Services (Networking Technology) at 85 (Cisco Press, Jun. 2005).
Johnson, S., "An Environment for Treating Youthful Offenders," The Robert F. Kennedy Youth Center, Offender Rehabilitation, vol. 2, No. 2, 1977; pp. 159-172.
Joint Application, filed in In re ASP GTEL Holdco, LLC, No. 11-184 (Fed. Commc'ns Comm'n Oct. 28, 2011).
Joint Claim Construction and Prehearing Statement, Exhibit B: Securus' Intrinsic and Extrinsic Evidence Charts, *Global Tel*Link Corporation v. Securus Technologies, Inc.*, No. 3:14-cv-00829-K (N.D. Tex.), Sep. 26, 2014.
Kandel et al., "Rapid Educational Rehabilitation for Prison Inmates," Behaviour Research & Therapy, vol. 14, 1976; pp. 323-331.
Karacki et al., "Rewards in an Institution for Youthful Offenders," The Howard Journal of Penology and Crime Prevention, vol. XIII, No. 1, 1970; pp. 20-30.
Kozamernik, F., "Media Streaming over the Internet—an overview of delivery technologies," EBU Technical Review (Oct. 2002).
Liebling, "Incentives and Earned Privileges Revisited: Fairness, Discretion, and the Quality of Prison Life," Journal of Scandanavian Studies in Criminology and Crime Prevention, vol. 9, 2008; pp. 25-41.
McKitterick et al., "State of the Art Review of Mobile Payment Technology," Department of Computer Science, Trinity College Dublin; 22 pages.
Microsoft Computer Dictionary, Fifth Edition, Microsoft Computer Press: Redmond, WA, 2002.
Newton, H., Newton's Telecom Dictionary (18th ed. 2002); p. 655.
Operator Service System Generic Requirements, OSSGR, TR-TSY-000271, Collect Billing, Rev. 3, Mar. 1988; 50 pages.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).
Pages from http://www.corp.att.com/history, archived by web.archive.org on Nov. 4, 2013.
Prosecution History of U.S. Appl. No. 11/005,816, filed Dec. 7, 2004.
Prosecution History of U.S. Appl. No. 11/045,589, filed Dec. 12, 2006.
Prosecution History of U.S. Appl. No. 11/562,842, filed Nov. 22, 2006.
Response to Office Action, filed Jan. 6, 2009, in Prosecution History of U.S. Appl. No. 10/642,532, filed Aug. 15, 2003.
Rey, R.F., ed., "Engineering and Operations in the Bell System," 2nd Edition, AT&T Bell Laboratories: Murray Hill, NJ, 1983.
Schwartz, et al., "How to Build an SMS Service," O'Reilly Short Cuts, 2007.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Segal, D., "Phoning From Prison, at Prices Through the Roof," The New York Times, Feb. 1, 2014.
Shields, T., "Prison Phones Prove Captive Market for Private Equity," Bloomberg Business, Oct. 4, 2012.
Sundstrom, K., "Voice over IP: An Engineering Analysis," Master's Thesis, Department of Electrical and Computer Engineering, University of Manitoba, Sep. 1999.
The Line Information Database (LIDB) and Wireless Services, Telcordia Technologies White Paper, Dec. 2001; 31 pages.
U.S. Appl. No. 60/377,763, filed May 3, 2002.
U.S. Appl. No. 60/607,447, "IP-based telephony system and method," to Apple, et al., filed Sep. 3, 2004.
U.S. Appl. No. 60/935,634, "Method of Enabling an SMS Text Message to Facilitate Payment on a Cellular Bill for a Billable Call Received on a Cell Phone," to Martin, et al., filed Aug. 23, 2007.

(56) References Cited

OTHER PUBLICATIONS

Valcourt, et al., "Investigating mobile payment: Supporting technologies, methods, and use," IEEE International Conference on Wireless and Mobile Computing, Networking, and Communications, 2005.

Walden, R., "Performance Trends for Analog-to-Digital Converters," IEEE Communications Magazine, Feb. 1999.

Waldon et al., The Industry Analysis Division's Reference Book of Rates, Price Indices, and Household Expenditures for Telephone Service, Mar. 1997; 167 pages.

Wireless Interconnection and Reciprocal Compensation Agreement Between Community Telephone Company and United States Cellular Corporation, Apr. 24, 2006; 29 pages.

Wormith, J.S., "The Development of a Prison Incentive System: A Case Illustration," Proceedings of the First Annual Corrections Research Forum, Ottawa Mar. 1989; pp. 77-93.

* cited by examiner

CONTROL OF INTERNET BROWSING IN A SECURE ENVIRONMENT

BACKGROUND

Field

The disclosure relates to a system and method to control internet browsing for inmates in a correctional facility.

Related Art

In some current correctional facilities, inmates are allowed supervised access to the internet to communicate with the outside. The supervised use of the internet is being approved for an increasing number of correctional facilities. With the introduction of computing devices into correctional facilities, various methods of supervision over inmate internet access are being implemented.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Embodiments may be implemented in hardware (e.g., circuits), firmware, computer instructions, or any combination thereof. Embodiments may be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, or other hardware devices Further, firmware, routines, computer instructions may be described herein as performing certain actions. However, it should be appreciated that such descriptions are merely for convenience and that such actions in fact results from computing devices, processors, controllers, or other devices executing the firmware, routines, instructions, etc. Further, any of the implementation variations may be carried out by a general purpose computer, as described below.

For purposes of this discussion, the term "module" shall be understood to include at least one of hardware (such as one or more circuit, microchip, processor, or device, or any combination thereof), firmware, computer instructions, and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

As the internet has become an essential part of daily life, it is hard to imagine a life without it. While those in society learn how to handle computers and the internet on a daily basis, inmates are blocked off from learning or maintaining their level of understanding unless provided with supervised internet access. Providing supervised access to the internet for inmates helps reduce recidivism as well as better prepare the inmates to keep up with the astonishing pace of the advancement of technology. Because most inmates are eventually released back into the public, any steps to minimize problems with their re-assimilation with society are highly beneficial. The internet provides a wider access to educational information, health information, job skills, probation assistance, and other resources which might help inmates negotiate a successful reentry into society and avoid reoffending.

However, easier accessibility to the internet for inmates makes necessary a need for increased supervision and monitoring. There are many unique concerns associated with providing internet access to inmates of controlled facilities. Inmates may use the internet for illegal purposes such as accessing phone directories, maps, and photographs for criminal activities. Most gang violence and drug trafficking is now coordinated through the internet and there is a concern that inmates may be able to keep up with criminal activities even while being incarcerated. Additionally, whereas inmate communications are highly regulated, access to the Internet provides the inmate with numerous new communications options for communicating with restricted parties, such as Internet-based text messaging, emailing, calling, instant messaging, etc. To further complicate matters, it is preferable to provide internet access to inmates via personal inmate devices (PIDs), which are portable electronics devices assigned to inmates for person use. It is important that inmates do not share contents on their respective personal inmate devices (PIDs) with other inmates.

With these concerns in mind, it is preferable to implement automated services in the current supervision and monitoring system for the control of Internet browsing by inmates in a controlled environment. This disclosure allows control over Internet browsing by inmates and addresses the security concerns raised by the need for protection of the general public. The disclosure also provides an advanced system for the continuous monitoring of inmates while accessing the internet. With this objective in mind, the following description is provided for a controlled internet browsing management system.

Exemplary Controlled Internet Browsing Management System Environment

Figure 1:
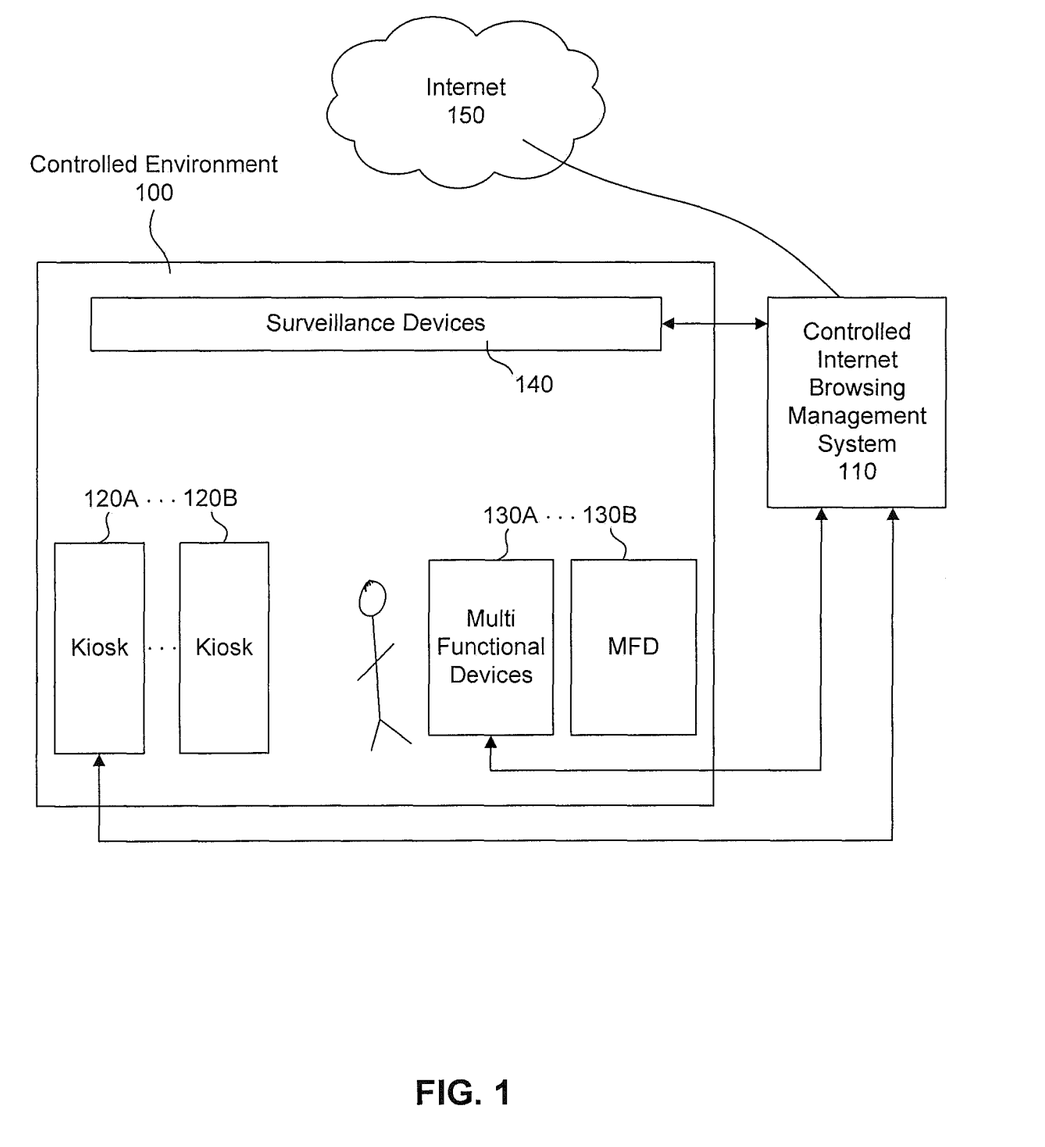
FIG. 1 illustrates a block diagram of a controlled internet browsing management system, according to an embodiment of the invention.

FIG. 1 illustrates an exemplary controlled Internet browsing management system environment 100. In the environment 100, a controlled Internet browsing management system ("CIBMS") 110 is connected to one or more kiosks 120A-B, one or more multifunctional devices ("MFDs") 130A-B, surveillance devices 140, and the Internet 150. The controlled Internet browsing management system 110 is connected to the one or more kiosks 120A-B, one or more multi-functional devices ("MFDs") 130A-B, and surveillance devices 140 through a wired connection or a wireless network, such as Local Area Network, Wide Area Network, an Ethernet connection, a Wi-Fi connection, or a cellular connection. The controlled internet browsing management system 110 serves as a gateway to the Internet 150 while filtering the contents for each respective inmate. As such, all Internet browsing activity by the inmates of the controlled environment facility passes through, and is controlled/managed by, the controlled internet browsing management system 110.

In an embodiment, the CIBMS 110 performs a variety of functions with respect to managing inmate access to the Internet, including controlling the types of Internet content accessible to the inmates, and monitoring the inmates throughout the period of Internet access. In order to accurately manage inmate access to the internet, the CIBMS 110 stores inmate profile information for each specific inmate and determines the appropriate materials accessible to each inmate based on the inmate profile information, further description will be provided in the following figures. In another embodiment, the CIBMS 110 monitors the inmates as they access the Internet in order to prevent an inmate from accessing contents that would have been otherwise unavailable to him or her through another inmate, further description will be provided in the following figures. The CIBMS 110 utilizes the cameras on the kiosk 120A-B or MFDs 130A-B, or other means, to detect any content sharing amongst the inmates.

In an embodiment, the kiosks 120A-B and/or the multi-functional devices 130A-B provide a platform for the inmates to access the internet. Kiosks 120A-B are installed in a location that is continuously monitored by surveillance devices 140. Such surveillance devices may include optical cameras, human personnel, and/or biometric sensors. In an embodiment, the inmates access the Internet through multifunctional devices 130A-B and Internet access through the multifunctional devices 130A-B is only permitted in predetermined locations under continuous monitoring by surveillance devices 140. Multifunctional devices include smart phones, personal inmate devices, laptop computers, tablet computers, among others.

In order to access the Internet through kiosks 120A-B or multifunctional devices 130A-B, the inmate's identity is determined by standard login procedures accompanied with verification of biometric information scans. For example, in an embodiment, the inmate attempting to login to the system will first provide a login ID and a password or PIN. Following the successful verification of this information, biometric information of the inmate will be acquired. There are many different types of biometric information that can be used, including a fingerprint, an iris scan, a voice recording, among others. In an embodiment, this information is compared against stored biometric information of the identity corresponding to the login information. If the system detects a match the stored information, then the user is granted access to the Internet. If no match is detected, the inmate is prevented access. The inmate may be granted multiple attempts at a successful login before being locked out of the system.

Once the CIBMS 110 verifies the inmate and authorizes access to the Internet, the CIBMS 110 retrieves Internet restrictions unique to that user from a user profile. In an embodiment, it may be necessary for each inmate to have personal restrictions that may differ from other inmates. For example, an inmate with a known proclivity towards pornography may have extremely broad restrictions on nude images, partial nude images, or even suggestive content, whereas other inmates may have access to such content. In an embodiment, the CIBMS 110 may also have global restrictions that are applicable to all inmates. Thus, by combining the personal restrictions with the global restrictions, a full filter profile can be applied to each individual inmate. Using this filter profile, the CIBMS 110 filters the Internet contents permitted for the inmate. Further description will be provided in the following figures.

In an embodiment, the surveillance devices 140 continuously monitor the inmates while they are accessing the internet. The surveillance devices 140 are connected over bidirectional communication links. These communication links allow for simultaneous transmission in order to improve the timeliness of the monitoring. The surveillance devices 140 detect any rule violation, such as content sharing, by the inmates while they access the internet. Surveillance devices include security cameras, 3-D cameras, infrared/night vision cameras, pan/tilt/zoom cameras, and varifocal cameras, among others.

Exemplary Controlled Internet Browsing Device

Figure 2:
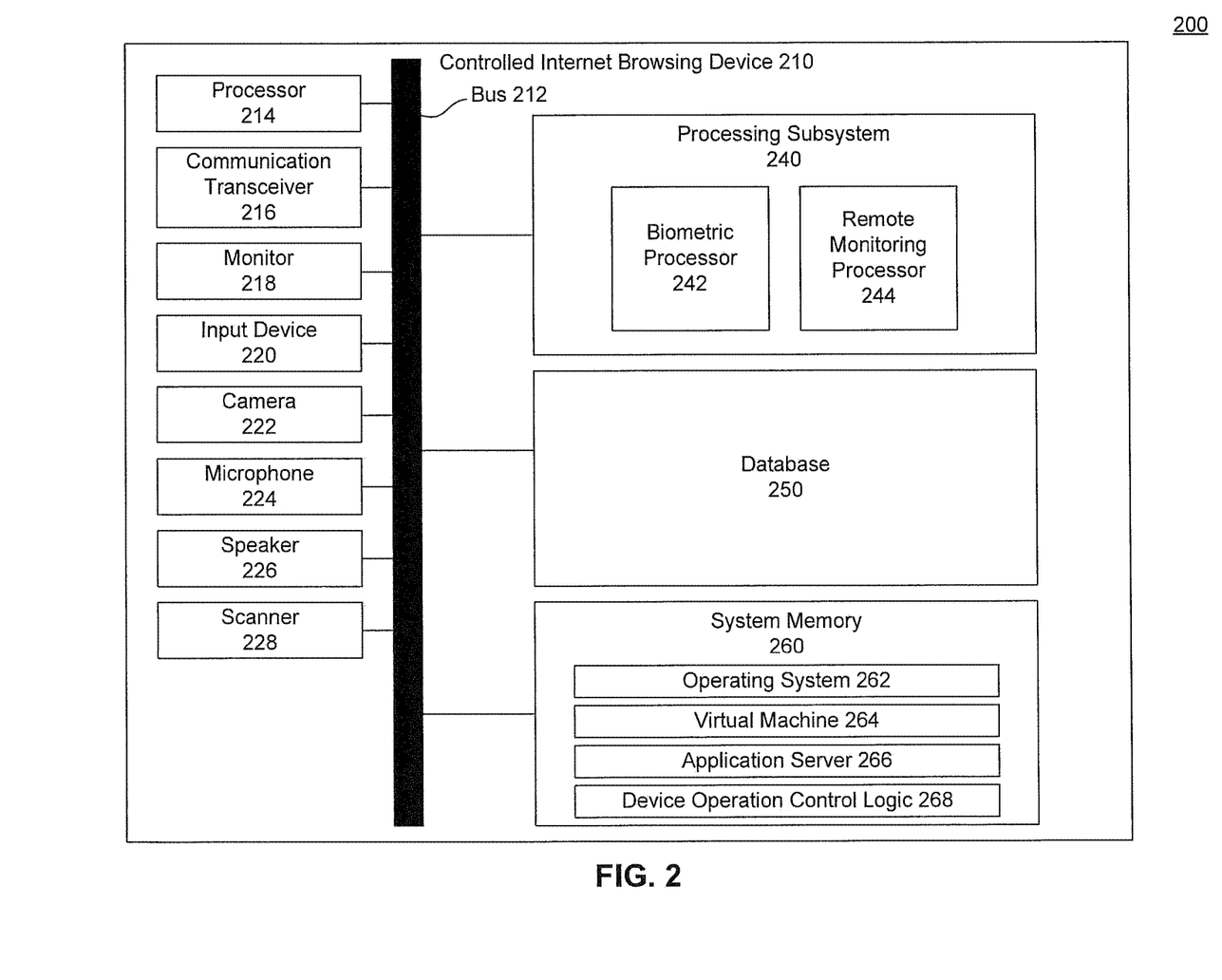
FIG. 2 illustrates a block diagram of a controlled internet browsing device, according to an embodiment of the invention.

FIG. 2 illustrates an exemplary controlled Internet browsing device 210, according to an embodiment. The controlled internet browsing device 210 includes at least a processing subsystem 240, a database 250, a system memory 260, and a plurality of peripherals 214-228 and may represent an exemplary embodiment of a kiosk 120A-B or a multifunctional device 130A-B illustrated in FIG. 1. The processing subsystem 240 includes a biometric processor 242 and a remote monitoring processor 244. The database 250 stores all information submitted and received by the inmate while accessing the internet before it is transmitted to the CIBMS 110. The system memory 260 contains the runtime environment of the controlled internet browsing device 210, storing temporary data of the operating system 262, virtual machine 264, application server 266, and controlled Internet browsing device operation control logic 268. The system memory is preferably faster and more efficient than the database 250, and is configured as random access memory (RAM) in an embodiment.

The controlled Internet browsing device 210 includes one or more processors 214 for implementing subsystems within the processing subsystem 240. The processing subsystem 240 is configured to include a selection of stored operations that, when executed in the one or more processors 214 causes the one or more processors 214 to perform the operations of the subsystem. In an embodiment, the one or more processors 214 are connected via a bus 212 to several other peripherals. Such peripherals include a communication transceiver 216 that provides network connectivity and communication, a monitor 218 for displaying information, an input device 220, such as a keyboard, touchscreen, and/or a mouse, a camera 222 for taking pictures and/or video monitoring of the inmate, a microphone 224, a speaker 226, and a scanner 228 to scan fingerprints, handprints, and/or other biometric measurements. The controlled Internet browsing device 210 implements the controlled internet browsing management system 110 and provides a platform through the multiple peripherals 214-228 to access the internet for contents that have been preapproved. In an embodiment, the controlled Internet browsing device 210 is configured to clear a user's browsing history, download history, form and search history, cookies, active logins, and cache, among others, after every internet access session. In another embodiment, the input device 220 is configured to allow or disallow keyboard function for an inmate depending on a website accessed during an internet access session and/or depending on the identity of the inmate accessing the system. For example, an inmate with computer fraud or hacking convictions may have a profile that requires a locked keyboard when not within a search text box of an Internet browser.

An inmate is required to provide login information and biometric information to access the internet through the controlled internet browsing device 210, according to an embodiment. The biometric information can be required one time for authentication or continuously during the internet access session. For example, an inmate can be required to submit biometric measurements such as fingerprints or handprints through a scanner 228 or take photographs through the camera 222 for facial recognition analysis. The biometric processor 242 utilizes the multiple peripherals 214-228 to scan the inmate's physical attributes and transmits the scanned biometric measurements to the CIBMS 110 for further verification. In order to perform "continuous" monitoring, the inmate's physical features are detected repeatedly at intervals during the session and verified. This may require the inmate to keep his face within a field of view of a camera, or keep his finger on a fingerprint scanner substantially throughout the duration of the session. In an embodiment, the Controlled Internet Browsing Device 210 can terminate the inmate's session when he fails to meet that requirement. In another embodiment, the scanned biometric measurements are transmitted to the remote monitoring processor to detect any rule violations regarding content sharing by the authorized inmate with other unauthorized inmates during an internet access session.

Once an inmate has been verified by the CIBMS 110 and granted authorization to access the Internet, the camera 222 on the controlled internet browsing device 210 is activated and monitors the inmate throughout the Internet access session to detect and prevent content sharing with other inmates, according to an embodiment of the invention. The camera 222 captures a video stream of the inmate accessing the controlled internet browsing device 210 to ensure that only the authorized inmate is accessing the internet. This can be performed through facial recognition and/or identification. In another embodiment, the camera 222 takes periodic photos of the authorized inmate accessing the controlled internet browsing device 210. The remote monitoring processor 244 identifies the authorized inmate present in the still image or video sequence based on the biometric measurement scanned by the biometric processor 242. The remote monitoring processor uses biometric facial image recognition to detect inmates other than the authorized inmate captured in the still image or video sequence. The remote monitoring processor 244 monitors the still image or video sequence for any time the authorized inmate is not visible or if an inmate other than the authorized inmate is accessing the device. The remote monitoring processor 244 can also detect whether two or more inmates are captured in the still image or video sequence utilizing face detection algorithms widely used in the related computer field. For example, face detection algorithms may detect faces based on typical skin color, based on the fact that a face is almost always moving in reality and calculating the moving area, or a combination of various approaches in order to achieve optimal results for face detection. In an embodiment, upon detection of an unauthorized inmate or more than two inmates captured in the still image or video sequence or if the authorized inmate is not visible for a predetermined period of time, the remote monitoring processor 244 disconnects the internet access and reports the violation to an administrator.

Exemplary Controlled Internet Browsing Management System

Figure 3:
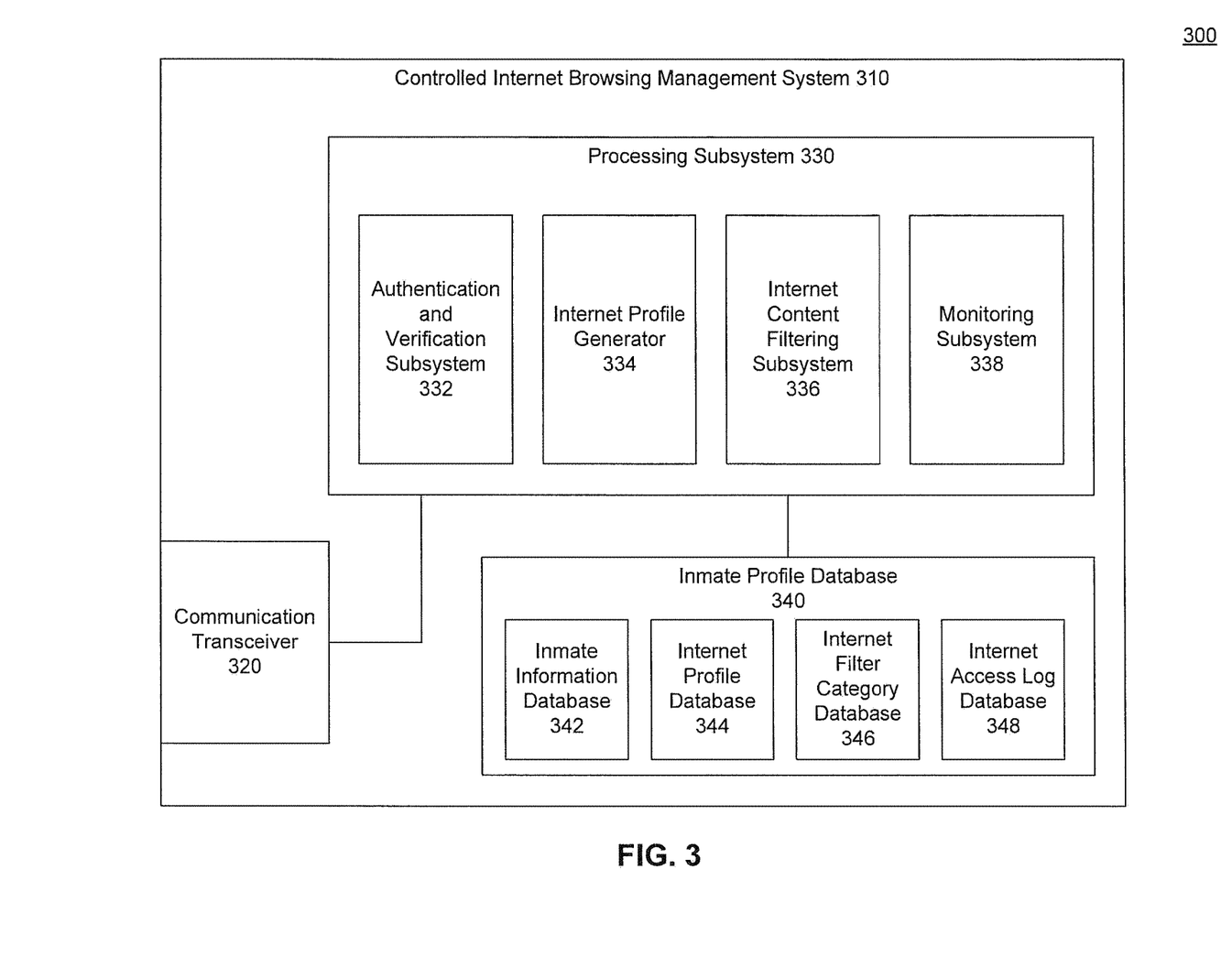
FIG. 3 illustrates a block diagram of a controlled internet browsing management system, according to an embodiment of the invention.

FIG. 3 illustrates an exemplary controlled Internet browsing management system ("CIBMS") 310, according to an embodiment of the invention. The CIBMS 310 includes at least a communication transceiver 320, a processing subsystem 330, and an inmate profile database 340, and may represent an exemplary embodiment of the CIBMS 110 illustrated in FIG. 1. The processing subsystem 330 includes an authentication and verification subsystem 332, an internet profile generator 334, an internet content filtering subsystem 336, and a monitoring subsystem 338. The inmate profile database 340 includes an inmate information database 342, an internet profile database 344, an internet filter category database 346, and an internet access log database 348. FIG. 3 is described below with additional references to FIGS. 1 and 2.

The communication transceiver 320 is used for the input and output processes of communication for the CIBMS 310, according to an embodiment of the invention. The communication transceiver 320 allows the CIBMS 310 to conduct two-way video, audio, and data communication between the controlled Internet browsing devices 210 and also serves as a gateway to the internet 150 for the controlled internet browsing devices. In another embodiment, the communication transceiver 320 allows two-way video, audio, and data communication between the surveillance devices 140 and the CIBMS 310.

When an inmate accesses a controlled Internet browsing device 210 and inputs his or her access information, the access information is transmitted to the CIBMS 310 for verification by the authentication and verification subsystem 332. The authentication and verification subsystem 332 performs authentication and verification techniques to identify the inmate and grant access to the internet. Upon receipt of the inmate's access information, such as a photo identification and previously assigned PIN (personal identification number), the authentication and verification subsystem 332 matches the provided identification information of the inmate with the inmate's profile in the inmate information database 342.

In an embodiment, for further verification of the inmate, the authentication and verification subsystem 332 is configured to acquire instantaneous authentication information, such as biometric information. The inmate's biometric information is received by the biometric processor 242 of the controlled Internet browsing device 210 and transmitted to the CIBMS 310. For example, the controlled Internet browsing device 210 may include one or more scanners, such as a fingerprint reader for capturing fingerprint data, camera for capturing facial information, stereoscopic camera for capturing 3-dimensional image data, infrared camera for capturing heat signature data, signature pad for capturing a signature of the inmate, microphone for capturing voice information, among others. In an embodiment, the authentication and verification subsystem 332 conducts voice recognition in order to further enforce the authentication process. The authentication and verification subsystem 332 analyzes the voice information of the inmate spoken through the microphone. The authentication and verification system 332 recognizes phonemes and/or intonations that identify the inmate's speech. The resulting voice pattern is associated with the inmate and compared with the inmate's voice pattern saved in the inmate information database 342. Similarly, in order to perform the additional verification, the authentication and verification subsystem 332 compares the captured biometric information to the stored biometric information in the inmate information database 342 and determines whether they match to a predetermined degree. If the captured biometric information does not match to a predetermined degree, the administrator is alerted and the inmate is denied access to the internet.

Once the CIBMS 310 determines that the inmate has provided the proper access information and has been verified by the authentication and verification subsystem 332, the inmate is allowed access to the Internet through the controlled Internet browsing device 210. The internet contents accessible for inmates are based on their Internet profiles. The Internet profile generator 334 generates Internet profiles for inmates, according to an embodiment of the invention. The Internet profile generator 334 uses the inmate information database 342 to generate Internet profiles for the inmates based on their offenses, charges, sentencing, current disciplinary status, among others. The Internet profiles consist of different categories of Internet contents and indication of which categories the inmate has permission to access. For example, the Internet profile generator 334 may generate an Internet profile that allows an inmate who only has one year left to complete a sentence in a controlled environment to search job market related websites. In this case, the inmate's Internet profile indicates that the inmate is allowed to access websites under the job market category. In an embodiment, the Internet profile generator 334 continuously updates an inmate's internet profile based on any changes made to the inmate's information in the inmate information database 342. In another embodiment, an administrator is able to view an inmate's internet profile and manually input which categories of Internet contents are permissible for the inmate. The inmate may submit a request to the administrator to modify his or her Internet profile to gain access to different internet contents.

Internet contents are filtered by the Internet content filtering subsystem 336 based on inmate Internet profiles before transmission to controlled Internet browsing devices 210, according to an embodiment of the invention. The Internet content filtering subsystem 336 accesses the Internet profile database 344 to determine which Internet content categories are permitted or prohibited for a specific inmate. As with inmate calling lists, the inmate Internet profiles can include a black list (categories prohibited) or a white list (categories allowed). Accordingly, the Internet content filtering subsystem 336 accesses the Internet filter category database 346 to determine the list of websites and keywords for the respective categories in order to filter the Internet contents according to the authorized inmate's profile. The Internet content filtering subsystem 336 consists of filters that rely on lists of URLs of the websites within the categories and a system of dynamic filtering.

The content filtering subsystem 336 can use several categorizations including human review, a licensed contextual URL filtering engine, internally developed neural net analysis programs, and automated recognition of content labels generated by the Internet Content Rating Association, among others. The dynamic filters analyze the websites as they are accessed by the inmates and allows or denies access to the websites depending on the determination of category. The dynamic filters ensure that each inmate's profiles are continually refreshed with new URLs and categories. In an embodiment, the dynamic filters automatically log accesses by existing users to URLs that are not included in the existing categorized database. These URLs are analyzed by the dynamic filter in order to determine whether or not to grant access to the inmate. In an embodiment, the unrecognized URLs are sent to a central repository where they are reviewed by the administrator. The administrator manually categorizes the URLs and adds the URLs to the database. In another embodiment, some filters block certain file types, such as GIF, JPEG, IMG, BMP, among others, which enables the internet content filtering subsystem 336 to block images within a category without blocking the text on the page. For example, a job market category list of websites includes Monster.com, Linkedin, Glassdoor.com, among others and an inmate who is permitted to access websites under the job market category is able to access the listed websites. In an embodiment, there are categories that are filtered regardless of an inmate's profile such as websites containing contents categorized as "sexually explicit" as well as "hate," "firearms," "violence," "gangs," and "drugs," among others.

In an embodiment, there are a number of websites that have not yet been categorized and when an inmate tries to access such a website, the Internet content filtering subsystem 336 temporarily blocks access to the website. The Internet content filtering system 336 scans the webpage and searches the webpage for problematic contents according to the inmate's internet profile. The Internet content filtering system 336 utilizes a system of dynamic filtering to automatically determine the category of the website. The inmate is allowed or denied access to the website depending on the determination. The Internet content filter system 336 stores the newly categorized website in the internet filter category database 346. In another embodiment, the website is temporarily blocked from access until an administrator reviews the website and determines the category. Accordingly, an administrator can view and manually adjust the lists of websites for different categories.

In an embodiment, the Internet content filtering subsystem 336 logs an inmate's activities throughout an Internet access session. Any web page viewed by an inmate throughout the Internet session is scanned by the Internet content filtering subsystem 336 and stored in the Internet access log database 348. In an embodiment, the Internet content filtering subsystem 336 monitors additional information relating to the session, such as the length of the session, contents the inmate has accessed, search history, browsing history, number of failed attempts to access restricted contents, number of attempts to bypass the security features of the CIBMS 310, keystrokes, etc.

Inmates are monitored throughout their Internet access sessions. Once an inmate has been verified by the CIBMS 110 and granted authorization to access the internet, the monitoring subsystem 338 monitors the inmates through the surveillance devices 140 to detect and prevent content sharing with other inmates, according to an embodiment of the invention. The inmates are allowed access to the Internet through their controlled internet browsing device 210 only in areas that can be monitored by surveillance devices 140. For example, kiosks 120A-B used for Internet access are installed in predetermined locations monitored by surveillance devices 140. The surveillance devices 140 captures a video stream of the inmate accessing the controlled Internet browsing device 210 to ensure that only the authorized inmate is accessing the Internet. In another embodiment, the surveillance devices 140 takes periodic photos of the authorized inmate accessing the controlled Internet browsing device 210. The monitoring subsystem 338 can identify people, kiosks, multifunctional devices. chairs, or other types of objects that may be present in the surveillance still image or video sequence. The monitoring subsystem 338 detects two or more inmates accessing the same controlled Internet browsing device 210 by identifying the number of people accessing a kiosk or a multifunctional device. Upon detection of two or more inmates accessing one controlled internet browsing device 210, the monitoring subsystem 338 disconnects the Internet access and reports the violation to an administrator.

The inmate information database 342 stores information on all aspects of an inmate's incarceration, according to an embodiment of the invention. The inmate information database includes physical information, biometric measurements, initial intake, charges, sentencing, property, housing, medical, meal planning, and scheduling, among others. The inmate information database 342 also includes disciplinary suspensions and Internet access suspension due to rule violations. The inmate information database also includes inmates' personal preferences such as favorite sports, hobbies, games, music/sounds, topics/objects, activities, animals, clothes, among others. In an embodiment, the inmate information is downloaded from a jail management system of the controlled environment. In another embodiment, the charges against an inmate are utilized by the internet profile generator 334 in order to determine the default internet profile for the inmate.

The internet profile database 344 stores inmates' internet profiles which contain internet restrictions and privileges during an internet access session, according to an embodiment of the invention. Each profile contains the permissible content that inmates may access on the Internet. The profiles indicate which internet filter categories are applied by the Internet content filtering subsystem 336 for the inmate. For example, if an inmate's profile indicates that a social media access filter is applied, then the internet content filtering subsystem 336 filters any social media websites. In an embodiment, the profile reflects an inmate's suspension of internet privileges due to rule violations or for disciplinary reasons. For example, the inmate's profile may indicate that he or she is suspended from accessing the Internet due to violation of internet content sharing with other inmates. Accordingly, an inmate who has been suspended from Internet access will have a profile which indicates that all Internet filter categories are applied and the inmate is denied access to any content on the internet throughout the suspension period.

In an embodiment, the Internet filter category database 346 stores categorized lists of websites for different types of Internet contents. Internet websites are categorized according to their contents and the resulting categorized lists of websites are stored in the Internet filter category database 346. The categorized list may be based on URLs for the websites or keywords that represent specific categories. For example, a sports filter category contains a list of URLs for websites that are related to tennis, football, baseball, basketball, among others. In an embodiment, the Internet content filtering subsystem 336 operates on a system of categories and refers to the categorized lists of websites contained in the Internet filter category database 346 when filtering the contents of the Internet during an inmate internet access session. In another embodiment, the categorized lists of websites are updated regularly by a system administrator or a certified third party.

The Internet access log database 348 stores the log of inmate Internet access sessions, according to an embodiment of the invention. The Internet access log database 346 stores information such as how long an inmate has been on the Internet, contents the inmate has accessed, search history, browsing history, number of failed attempts to access restricted contents, number of attempts to bypass the security features of the CIBMS 310, among others. The Internet access log database 348 provides information regarding an inmate's Internet search pattern and personal preferences. Additionally, reports of failed attempts to access restricted contents is reported and scrutinized by the administrator.

System Operation

Figure 4:
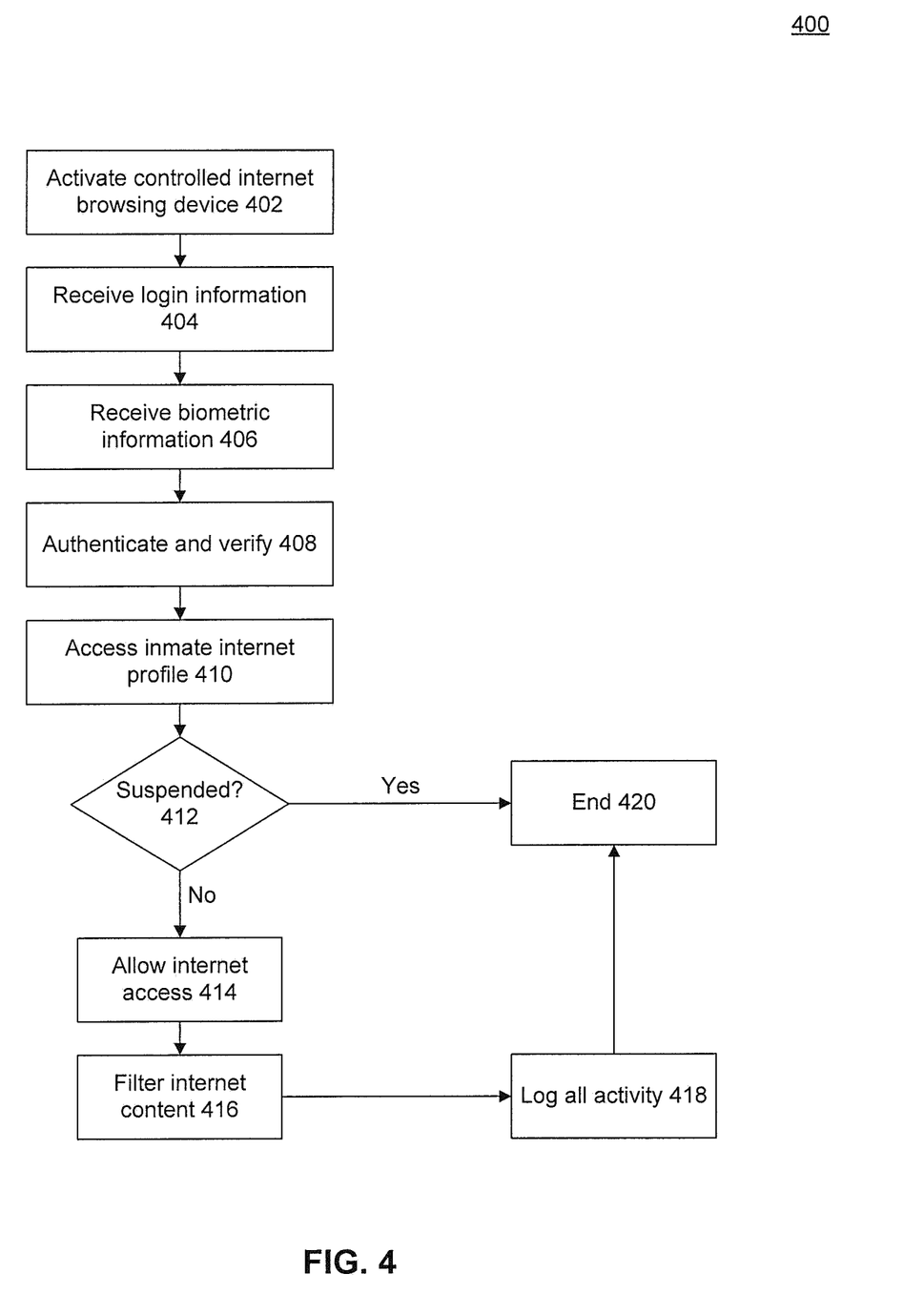
FIG. 4 illustrates a flowchart diagram of a method of operation of the controlled internet browsing management system, according to an embodiment of the invention.

The operation of the system will be first described in FIG. 4, which illustrates a flowchart diagram of an exemplary method 400 of controlling inmate internet access. The method of FIG. 4 is described below with reference to FIGS. 1, 2, and 3.

The Internet access sessions are facilitated by controlled Internet browsing devices 210 such as a kiosk 120A-B or a multifunctional device 130A-B. At the outset, an inmate initiates an Internet access session by activating his or her controlled internet browsing device 210 (402). The inmate provides his or her login information, such as a personal identification number and associated password, on the controlled Internet browsing device 210 and the login information is received by the system (404). The authentication and verification process may also require the receipt of the inmate's biometric information (406). For example, the controlled Internet browsing device 210 may include one or more scanners, such as a fingerprint reader for capturing fingerprint data, camera for capturing facial information, stereoscopic camera for capturing 3-dimensional image data, infrared camera for capturing heat signature data, signature pad for capturing a signature of the inmate, microphone for capturing voice information, among others. The authentication and verification subsystem 332 can be configured for any of these types of authentication information. For example, authentication can be performed based on facial architecture in the case of 3D images, or based on signature analysis, etc. If the inmate fails a predetermined number of attempts to authenticate themselves, the administrator is immediately notified. Upon receipt of the login information and the biometric information, the authentication and verification subsystem 332 performs authentication and verification to ensure that the inmate is who he or she claims to be (408).

Once the inmate is verified, the system accesses the inmate's Internet profile in the internet profile database 344 (410) to determine the Internet contents that are permitted for the inmate. The Internet profile generator 334 generates Internet profiles for inmates. The Internet profile generator 334 uses the inmate information database 342 to generate internet profiles for the inmates based on their offenses, charges, sentencing, current disciplinary status, among others. In an embodiment, the Internet profile generator 334 generates a new inmate profile only when the inmate is initially registered with the system, or upon a first access attempt to the Internet. Thereafter, the Internet profile generator 334 simply retrieves the previously-generated profile for the inmate. The internet profiles consist of different categories of internet contents and indication of which categories the inmate has permission to access. The inmate's internet profile also stores information regarding whether or not the inmate is suspended from internet access. If the inmate is suspended from internet access (412—Y), then the internet session is terminated (420). If the inmate is not suspended from internet access (412—N), then the inmate is allowed internet access (414).

All internet access for the inmate is filtered for the permitted contents for the particular inmate (416). Internet contents are filtered by the internet content filtering subsystem 336 based on inmate Internet profiles before transmission to controlled Internet browsing devices 210 and viewed by the inmate. The Internet content filtering subsystem 336 accesses the Internet profile database 344 to determine which internet content categories are permitted for a specific inmate. Accordingly, the internet content filtering subsystem 336 accesses the internet filter category database 346 to determine the list of websites and keywords for the respective categories in order to filter the internet contents according to the inmate's profile. The Internet content filtering subsystem 336 consists of filters that rely on lists of URLs of the websites within the categories and a system of dynamic filtering. There are a number of websites that have not yet been categorized and when an inmate tries to access such a website, the Internet content filtering subsystem 336 temporarily blocks access to the website. The Internet content filtering system 336 utilizes a system of dynamic filtering to automatically determine the category of the website. The inmate is allowed or denied access to the website depending on the determination. The internet content filter system 336 stores the newly categorized website in the internet filter category database 346.

The Internet content filtering subsystem 336 logs all of the inmate's activities throughout an internet access session (418). Any web page viewed by an inmate throughout the internet session is scanned by the Internet content filtering subsystem 336 and stored in the internet access log database 348. The internet access session concludes once the inmate's access time is expired or when the inmate chooses to log off of the system (420).

Figure 5:
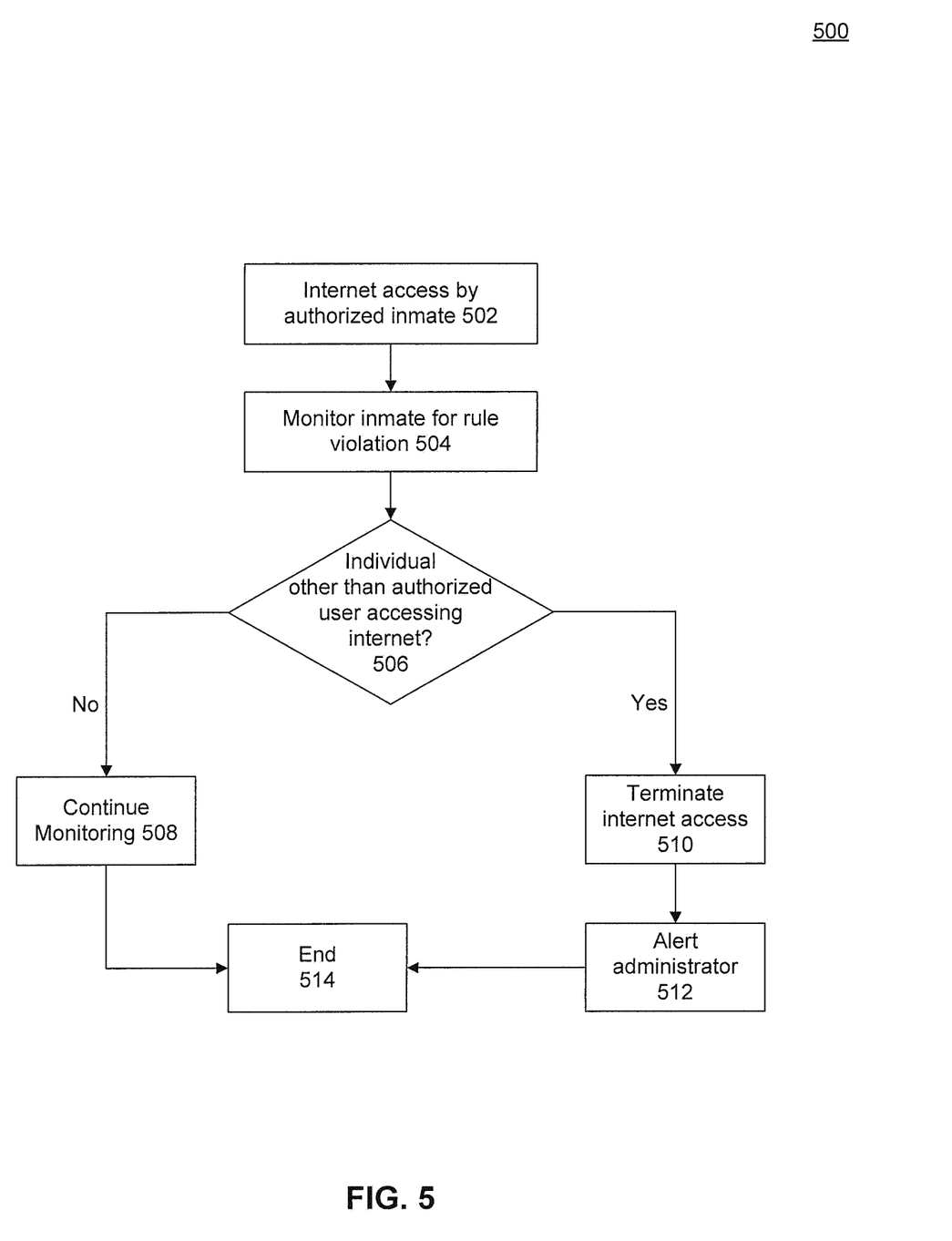
FIG. 5 illustrates a flowchart diagram of a method of monitoring the inmates when accessing the controlled internet browsing management system, according to an embodiment of the invention.

FIG. 5 illustrates a flowchart diagram of an exemplary method 500 of monitoring the inmates while accessing the controlled Internet browsing management system. The method of FIG. 5 is described below with reference to FIGS. 1, 2, and 3.

At the outset, an inmate initiates an internet access session by activating his or her controlled Internet browsing device 210 (502). Once the inmate is authorized for Internet access, the inmate is monitored for any rule violations throughout the Internet access session (504). The inmate is monitored through the camera 222 on the controlled Internet browsing device 210 and the surveillance devices 140. The camera 222 captures a video stream or periodic photos of the inmate accessing the controlled Internet browsing device 210. The remote monitoring processor 244 identifies the authorized inmate present in the still image or video sequence based on the biometric measurement scanned by the biometric processor 242. The remote monitoring processor uses biometric facial image recognition to detect inmates other than the authorized inmate captured in the still image or video sequence. The remote monitoring processor 244 can also detect whether an unauthorized inmate or two or more inmates are accessing the controlled internet browsing device 504. Running parallel with the camera 222 on the controlled internet browsing device 210, the surveillance devices monitor the inmates to detect and prevent content sharing with other inmates. The surveillance devices 140 capture a video stream of the inmate accessing the controlled Internet browsing device 210 to ensure that only the authorized inmate is accessing the internet. The monitoring subsystem 338 detects two or more inmates accessing the same controlled internet browsing device 210 by identifying the number of people accessing a kiosk or a multifunctional device.

Upon detection of two or more inmates accessing one controlled Internet browsing device 210 (506—Y) by either the camera 222 on the controlled Internet browsing device 210 or the surveillance devices 140, the system terminates the Internet access (510) and alerts the administrator (512) of the rule violation and concludes the Internet access session (514). If the system does not detect any other individuals other than the authorized inmate accessing the Internet (506—N), then the system allows the inmate to access the Internet and continues to monitor the inmate for rule violations (508). The internet access session concludes once the inmate's access time is expired or when the inmate chooses to log off of the system (514).

Exemplary Computer System Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
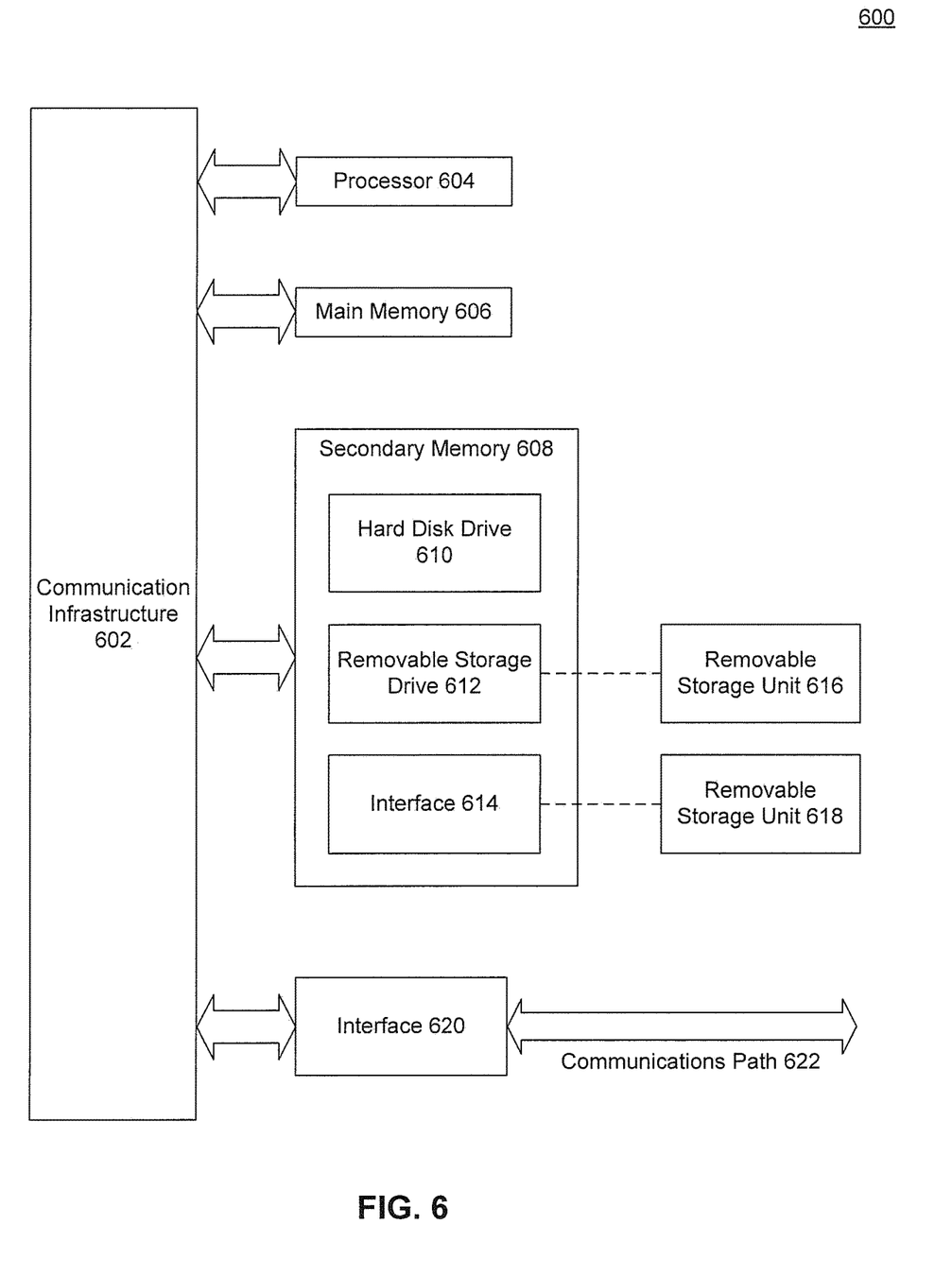
FIG. 6 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of flowcharts 400 and 500 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure.

What is claimed is:

1. An Internet access system for providing Internet access to an inmate of a controlled environment facility, the Internet access system comprising:

an input device configured to receive login information from the inmate;

an authentication subsystem configured to verify an identity of the inmate based on the received login information;

an internet profile generator configured to retrieve an inmate internet profile associated with the inmate, the inmate internet profile including an offense committed by the inmate, the internet profile generator further configured to generate Internet browsing restrictions based on the offense and a global internet profile;

an Internet content filtering subsystem configured to provide Internet access to an Internet viewing device used by the inmate in accordance with the Internet browsing restrictions, the Internet content filtering system including a dynamic filter configured to:

analyze uncategorized websites to identify categories of contents, the analyzing including:

scanning a webpage;

identifying, based on the inmate profile, prohibitive categories of information; and searching the scanned webpage for contents matching one or more of the prohibitive categories of information;

grant or deny access based on the analysis;

end the uncategorized websites to an administrator for manual review; and register the uncategorized websites in a filter database in association with their identified categories based on the manual review; and an environment monitor configured to detect a presence of an unauthorized individual within viewing vicinity of the Internet viewing device in addition to the inmate, the environment monitoring subsystem configured to terminate the Internet access in response to the detecting.

2. The Internet access system of claim 1, wherein the login information includes biometric information.

3. The Internet access system of claim 2, wherein the authentication subsystem is configured to calculate a statistical comparison between the received biometric information and previously-stored biometric information.

4. The Internet access system of claim 1, wherein the internet profile generator is configured to receive a law enforcement record associated with the inmate and to generate the inmate internet profile based on the law enforcement record.

5. The Internet access system of claim 1, wherein the global internet profile includes browsing restrictions applicable to all inmates of the controlled environment facility.

6. The Internet access system of claim 5, wherein the Internet browsing restrictions include the browsing restrictions applicable to all inmates and inmate-specific browsing restrictions.

7. The Internet access system of claim 1, wherein the inmate internet profile includes browsing restrictions specifically applicable to the inmate.

8. A portable personal inmate Internet access device for providing Internet access to an inmate of a controlled environment facility, the portable personal inmate Internet access device comprising:
an input device configured to receive login information of the inmate;
a processor configured to compare the received login information to previously-stored identifying information of the inmate, and to grant Internet access to the inmate based on the comparison;
a memory that stores Internet browsing restrictions associated with the inmate's Internet access, the Internet browsing restrictions being defined based on an offense committed by the inmate;
an Internet activity monitor configured to permit Internet browsing by the inmate in accordance with the browsing restrictions, the Internet activity monitor including a dynamic filter configured to:
analyze uncategorized websites to identify categories of contents, the analyzing including:
scanning a webpage;
identifying, based on the inmate profile, prohibitive categories of information; and
searching the scanned webpage for contents matching one or more of the prohibitive categories of information;
grant or deny access based on the analysis;
send the uncategorized websites to an administrator for manual review; and
register the uncategorized websites in a filter database in association with their identified categories based on the manual review; and
an environment monitor configured to detect a presence of an unauthorized individual within viewing vicinity of the portable personal inmate Internet access device in addition to the inmate, the environment monitoring subsystem configured to terminate the Internet browsing in response to the detecting.

9. The portable personal inmate Internet access device of claim 8, wherein the processor is configured to retrieve a global Internet profile from a central server, the global Internet profile defining browsing restrictions applicable to all inmates.

10. The portable personal inmate Internet access device of claim 9, wherein the memory stores an inmate Internet profile that defines browsing restrictions applicable specifically to the inmate, and
the processor is configured to combine the browsing restrictions defined in the global Internet profile with the browsing restrictions defined in the inmate Internet profile to generate the Internet browsing restrictions.

11. The portable personal inmate Internet access device of claim 8, further comprising a continuous authentication device configured to continuously obtain identifying information of the inmate during an Internet browsing session.

12. The portable personal inmate Internet access device of claim 11, wherein the processor is configured to authenticate the continuously obtained identifying information of the inmate.

13. The portable personal inmate Internet access device of claim 12, wherein the Internet browsing session includes a time period during which the inmate is browsing the Internet.

14. The portable personal inmate Internet access device of claim 12, wherein the processor is configured to terminate the Internet browsing session in response to determining that the continuously obtained identifying information is not authenticated.

15. A method for permitting Internet access to an inmate of a controlled environment facility, the method comprising:
receiving a purported identity of the inmate together with identifying information of the inmate;
authenticating the identifying information against previously-stored information associated with the purported identity;
retrieving an inmate Internet profile defining browsing restrictions for the inmate, the inmate Internet profile including an offense committed by the inmate;
generating session browsing restrictions based on the offense that define the browsing restrictions for a current Internet browsing session;
permitting Internet access to an Internet viewing device used by the inmate in accordance with the session browsing restrictions;
during Internet access:
analyzing uncategorized websites to identify categories of contents, the analyzing including:
scanning a webpage;
identifying, based on the inmate profile, prohibitive categories of information; and
searching the scanned webpage for contents matching one or more of the prohibitive categories of information;
granting or denying access to the webpage based on the analysis;
sending the uncategorized websites to an administrator for manual review; and
registering the uncategorized websites in a filter database in association with their identified categories based on the manual review;
monitoring an environment associated with the Internet viewing device to detect a presence of an unauthorized individual within viewing vicinity of the Internet viewing device in addition to the inmate; and
terminating the Internet access in response to the detecting of the unauthorized individual.

16. The method of claim 15, further comprising:
retrieving a global Internet profile defining browsing restrictions for all inmates of the controlled environment facility; and
generating the session browsing restrictions based on the global Internet profile.

17. The method of claim 15, further comprising:
obtaining, at regular intervals during the Internet browsing session, biometric information of the inmate; and
authenticating each of the obtained biometric information against previously-stored biometric information of the inmate.

18. The method of claim 17, further comprising: terminating the Internet browsing session in response to any of the obtained biometric information not being authenticated.

19. The method of claim 15, further comprising generating the inmate Internet profile, the generating including:
receiving a criminal report associated with the inmate, the criminal report detailing crimes committed; and
associating each of the detailed crimes with one or more content categories.

20. The method of claim 19, further comprising generating the inmate Internet profile to include browsing restrictions relating to each of the content categories.

* * * * *